US012605715B2

(12) United States Patent
Chen

(10) Patent No.: US 12,605,715 B2
(45) Date of Patent: Apr. 21, 2026

(54) MAGNETIC STAND

(71) Applicant: CELO BIOTECH INC., Taipei City (TW)

(72) Inventor: Huai-Lu Chen, Taipei City (TW)

(73) Assignee: CELO BIOTECH INC., Taipei City (TW)

( * ) Notice: Subject to any disclaimer, the term of this patent is extended or adjusted under 35 U.S.C. 154(b) by 726 days.

(21) Appl. No.: 18/073,590

(22) Filed: Dec. 2, 2022

(65) Prior Publication Data

US 2024/0181463 A1 Jun. 6, 2024

(51) Int. Cl.
*B01L 9/06* (2006.01)
*B01L 9/00* (2006.01)

(52) U.S. Cl.
CPC ....... *B01L 9/523* (2013.01); *B01L 2300/0832* (2013.01)

(58) Field of Classification Search
None
See application file for complete search history.

(56) References Cited

U.S. PATENT DOCUMENTS

2006/0038648 A1* 2/2006 Humphries ....... B01L 3/502761 335/306
2015/0119274 A1* 4/2015 Piletsky ........... G01N 33/54326 506/40
2017/0080430 A1* 3/2017 Fu ............................ B03C 1/02
2020/0181684 A1* 6/2020 Tiedtke ................. B03C 1/0332

* cited by examiner

*Primary Examiner* — Paul S Hyun

(57) ABSTRACT

A magnetic stand comprises a stand having at least one recess and a magnetic structure having a tapered shape. The magnetic structure has a top and a bottom, the top of the magnetic structure is narrower than the bottom of the magnetic structure. The magnetic structure is configured in/on the stand, and the recess of the stand is located around a side of the magnetic structure.

17 Claims, 23 Drawing Sheets

MAGNETIC STAND

BACKGROUND OF THE INVENTION

1. Field of the Invention

The present disclosure relates to a magnetic stand, and in particular to a magnetic stand for capturing magnetic beads.

2. Description of the Related Art

A magnetic stand is a tool used for magnetic bead-based DNA/RNA/protein isolation. Magnetic beads can be used to capture DNA/RNA/protein for analyzing and purification of DNA/RNA/protein. For collecting the magnetic bead-captured DNA/RNA/protein reacted in solution in a tube, the tube containing the solution and the magnetic beads capturing DNA/RNA/protein suspended in the solution is placed in a magnetic stand, the magnetic stand consists of a plastic stand and at least one magnet configured inside the plastic stand, when the tube is placed on the magnetic stand, the magnetic beads capturing DNA/RNA/protein suspended in the solution are condensed on an inner wall of the tube near the bottom of the tube via the magnetic attraction between the magnetic beads and the magnet inside the plastic stand, thereby the condensed magnetic beads which capture DNA/RNA/protein can be readily taken by a pipette, and then the captured DNA/RNA/protein can be separated from the magnetic beads to perform further analysis and purification.

BRIEF SUMMARY OF THE INVENTION

However, an issue to be addressed in conventional magnetic stands still exists. When the tube containing the magnetic beads capturing DNA/RNA/protein suspended in the solution is placed on the magnetic stand, the magnetic beads capturing DNA/RNA/protein are spread on a relatively large area of the inner wall of the tube rather than condensed on a spot of the inner wall of the tube. As a result, this would make some magnetic beads unable to be taken out and remain suspended in the solution such that the leftover DNA/RNA/protein captured by the magnetic beads would not be further analyzed or purified.

An objective of the present disclosure is to provide a magnetic stand comprising: a stand body having at least one recess cavity; and a magnetic structure having a tapered shape, wherein the magnetic structure has a top and a bottom, the top of the magnetic structure is narrower than the bottom of the magnetic structure; wherein the magnetic structure is located in/on the stand, the at least one recess cavity of the stand body is located around a side of the magnetic structure.

Regarding the magnetic stand, the magnetic structure includes a first magnetic block and a second magnetic block, the second magnetic block is above the first magnetic block, and a diameter of the second magnetic block is smaller than a diameter of the first magnetic block.

Regarding the magnetic stand, a bottom of the at least one recess cavity of the stand body is placed between a top of the first magnet block and a position at twice the height of the second magnetic block from a bottom of the second magnetic block.

Regarding the magnetic stand, a ratio between the diameter of the second magnetic block and the diameter of the first magnetic block is 1:1.3 to 1:20.

Regarding the magnetic stand, a ratio between a height of the second magnetic block and a height of the first magnetic block is 20:1 to 1:20.

Regarding the magnetic stand, the magnetic structure includes a third magnetic block, the third magnetic block is above the second magnetic block, and a diameter of the third magnetic block is smaller than the diameter of the second magnetic block.

Regarding the magnetic stand, wherein a ratio between the diameter of the third magnetic block and the diameter of the second magnetic block is 1:1.3 to 1:20.

Regarding the magnetic stand, wherein a ratio between a height of the third magnetic block and a height of the second magnetic block is 20:1 to 1:20.

Regarding the magnetic stand, the magnetic stand body further comprises a metal plate, wherein the metal plate is able to be magnetically attracted and located in/on the stand body below the first magnetic block.

Regarding the magnetic stand, a horizontal cross-sectional area of the metal plate is larger than 70% of a horizontal cross-sectional area of the first magnetic block.

Regarding the magnetic stand, a bottom of the at least one recess cavity of the stand body is placed between a one third (⅓) height of the magnetic structure and a 1.5-fold height of the magnetic structure.

Regarding the magnetic stand, the stand body has an observation window opening formed to surround a side of the at least one recess cavity and communicate with the at least one recess cavity, and the observation window opening serves as an inlet that links the at least one recess cavity and the side of the magnetic structure.

Regarding the magnetic stand, the stand body has at least two recess cavities.

Regarding the magnetic stand, the stand body has a plurality of observation window openings corresponding to the number of recess cavities, each of the observation window openings is formed to surround a side of the corresponding recess cavity and communicate with the at least one recess cavity, and each of the observation window openings serves as an inlet that links the corresponding recess cavity and the side of the magnetic structure.

Regarding the magnetic stand, the stand body has a plurality of slits corresponding to the numbers of the recess cavities, each of the slits is formed between two adjacent recess cavities and links the adjacent recess cavities.

Regarding the magnetic stand, the magnetic stand further comprises a lid correspondingly covering the at least one recess cavities of the stand body to protect the at least one recess cavity from contamination and having a tube-holding groove formed on a surface of the lid facing toward the at least one recess cavity of the stand body.

To achieve at least the above objective, the present disclosure further provides a magnetic stand comprising: a stand body having at least two recess cavities and a magnetic structure including a first magnetic block and a second magnetic block. The first magnetic block and the second magnetic block are located in/on the stand body, with the second magnetic block above the first magnetic block. A diameter ratio between a diameter of the second magnetic block and a diameter of the first magnetic block is 1:1.3 to 1:20. A height ratio between a height of the second magnetic block and a height of the first magnetic block is 20:1 to 1:20. The recess cavities of the stand body surround a side of the second magnetic block, and a bottom of the recess cavities of the stand body is placed between a top of the first magnet block and a position at twice the height of the second magnetic block from a bottom of the second magnetic block.

A plurality of observation window openings corresponding to the number of recess cavities are provided, where each of the observation window openings is formed to surround a side of the corresponding recess cavity and communicate with the at least one recess cavity, and each of the observation window openings serves as an inlet that links the corresponding recess cavity and the side of the magnetic structure.

Regarding the magnetic stand, the stand body has a plurality of observation window slits corresponding to the number of recess cavities, where each of the observation window slits is formed between two adjacent recess cavities and links the adjacent recess cavities.

To achieve at least the above objective, the present disclosure further provides a magnetic stand comprising: a stand body having at least two recess cavities, a magnetic structure including a first magnetic block and a second magnetic block, a plurality of observation window openings and a lid. The first magnetic block and the second magnetic block are located in/on the stand, with the second magnetic block above the first magnetic block. A diameter ratio between a diameter of the second magnetic block and a diameter of the first magnetic block is 1:1.3 to 1:20. A height ratio between a height of the second magnetic block and a height of the first magnetic block is 20:1 to 1:20. The recess cavities of the stand body surround a side of the second magnetic block, and a bottom of the recess cavities of the stand body is placed between a top of the first magnet block and a position at twice the height of the second magnetic block from a bottom of the first magnetic block. The plurality of observation window openings corresponding to the numbers of the recess cavities is provided, where each of the observation window openings is formed to surround a side of the corresponding recess cavity and communicate with the at least one recess cavity, and each of the observation window openings serves as an inlet that links the corresponding recess cavity and the side of the magnetic structure. The lid covers the recesses cavity of the stand body to protect the recess cavities from contamination and has a plurality of tube-holding grooves formed on a surface of the lid facing toward the recess cavities of the stand body.

Therefore, the present invention provides a magnetic stand which allows magnetic beads suspended in solution in a tube to be condensed on a spot of an inner wall of the tube.

DETAILED DESCRIPTION OF THE INVENTION

To facilitate understanding of the object, characteristics and effects of this present disclosure, embodiments together with the attached drawings for the detailed description of the present disclosure are provided.

Figure 1:
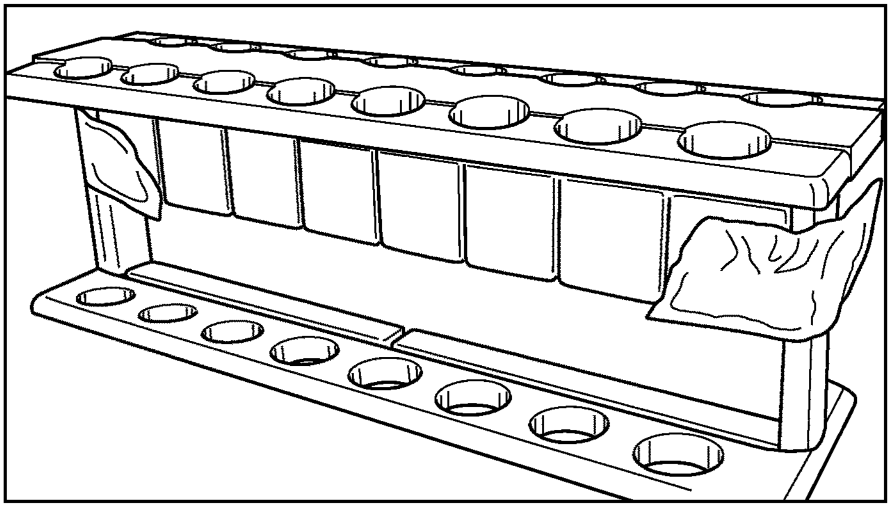
(prior art) FIG. 1
FIG. 1 is a schematic view of a conventional magnetic stand according to the prior art.
Figure 2:
(prior art) FIG. 2
FIG. 2 is a drawing showing magnetic beads spreading on an inner wall of a tube placed in a conventional magnetic stand according to the prior art.
Figure 3:
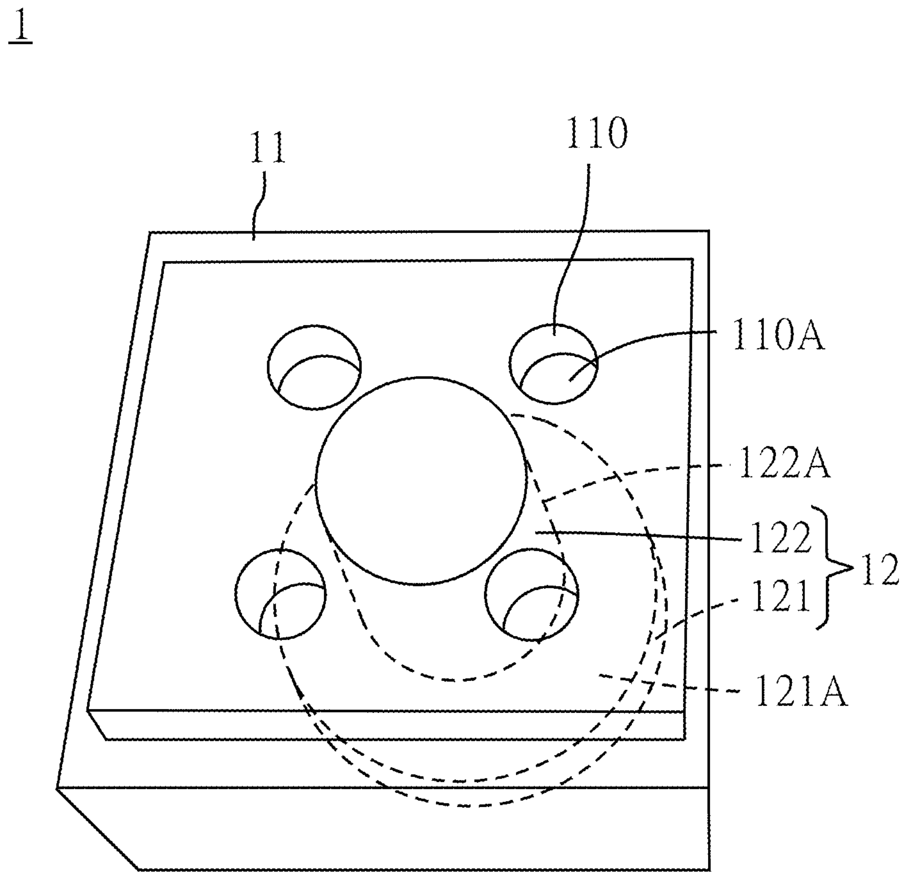
FIG. 3 is a perspective view of the magnetic stand according to a first embodiment of the present disclosure.

The first embodiment of the present disclosure provides a magnetic stand 1. Refer to FIG. 3, which shows a perspective view of the magnetic stand 1. The magnetic stand 1 comprises a stand 11, a first magnetic block 121 (N35 neodymium magnet) and a second magnetic block 122 (N35 neodymium magnet). The second magnetic block 122 is mounted inside the stand 11 and the first magnetic block 121 contacts with the second magnetic block 122 and is mounted outside the stand 11.

The second magnetic block 122 is disposed on the first magnetic block 121. A diameter of the second magnetic block 122 is smaller than a diameter of the first magnetic block 121, thereby a magnetic structure 12 having a tapered shape is composed of the second magnetic block 122 and the first magnetic block 121. For example, the diameter of the second magnetic block 122 is 8 mm and the diameter of the first magnetic block 121 is 18 mm; the height of the second magnetic block 122 is 10 mm and the height of the first magnetic block 121 is 2 mm.

The stand 11 is made of polyethylene (the stand 11 can also be made of other plastic materials or other kinds of well-known material). The stand 11 has four recesses 110, the recesses 110 are located around a side 122A of the magnetic structure 12 equidistantly spaced apart and surround the side 122A of the magnetic structure 12. A bottom 110A of each recess 110 of the stand 11 is at about a two thirds (⅔) height of the second magnetic block 122, that is, the bottom 110A of each recess 110 of the stand 11 is at about a three fourths (¾) height of the magnetic structure 12. In other embodiments, the bottom 110A of each recess 110 may be placed between a one third (⅓) height of the magnetic structure 12 and a 1.5-fold height of the magnetic structure 12, or the bottom 110A of each recess 110 may be placed between a top 121A of the first magnetic block 121 and a position where a 2-fold height of the second magnetic block 122 is.

To investigate the magnetic attraction of the magnetic stand 1 to magnetic beads, a test of magnetic attraction of the magnetic stand 1 to magnetic beads is performed as follows.

First, micro magnet beads are prepared (AMPure XP beads, Beckman Coulter). Second, 50 μl of aforementioned magnet beads are added into 950 μl of pure water. The solution containing the magnet beads and the pure water is thoroughly mixed until the solution becomes a uniform homogenous solution. Aliquot 100 μl of the solution containing the magnet beads and the pure water is then added into each of two micro tubes (0.2 ml). Finally, the tubes containing the above solution are inserted into the recesses 110 of the magnetic stand 1 for observing whether the magnetic beads suspended in the solution are condensed on a spot of an inner wall of each micro tube when the micro tubes are placed in the recesses 110 of the magnetic stand 1.

Figure 4:
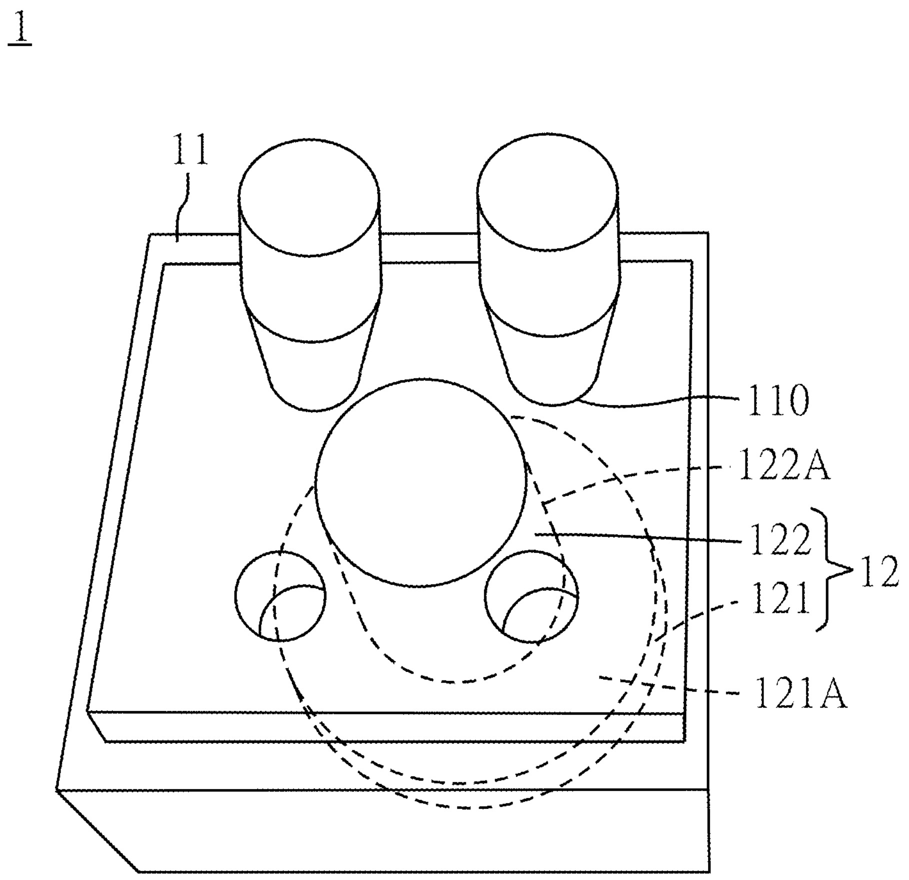
FIG. 4 is a schematic view showing two micro tubes placed in the magnetic stand according to the first embodiment of the present disclosure.
Figure 5:
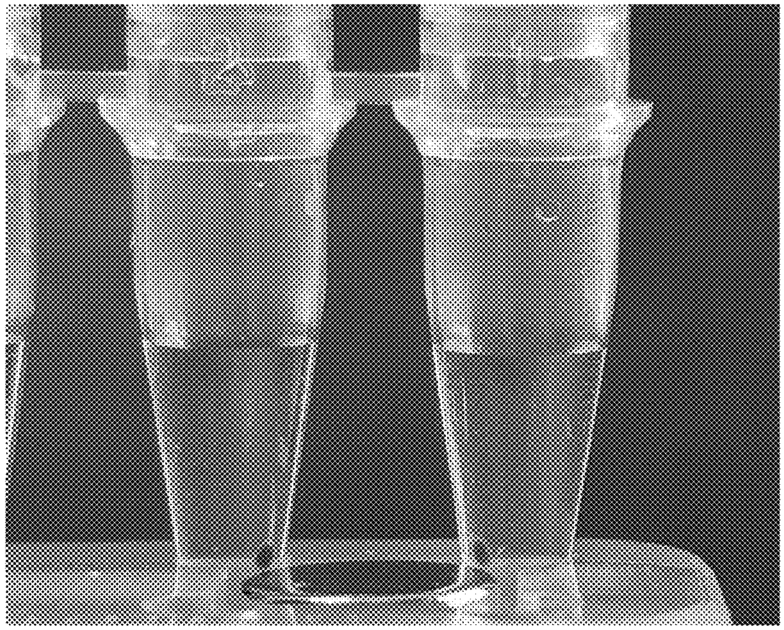
FIG. 5 is a picture showing magnetic beads condensed on an inner wall of a tube placed in the magnetic stand according to the first embodiment of the present disclosure.

Refer to FIG. 4 and FIG. 5, which show the result of the test of magnetic attraction of the magnetic stand 1 to magnetic beads. When the micro tubes containing magnetic beads suspended in the solution are placed in the recesses 110 of the magnetic stand 1, magnetic beads are condensed on a spot of the inner wall of each micro tube. This allows an operator to retrieve most magnetic beads from each micro tube, and avoid trace of magnetic beads in the micro tubes, such that all of DNA/RNA/protein captured by magnetic beads can be taken out for the following analysis and purification.

In the first embodiment, the stand 11 has four recesses 110, but in other embodiments, the stand 11 may have a single recess, two recesses, three recesses or other numbers of recesses.

In the first embodiment, the tapered shape of the magnetic structure 12 is a pyramid structure, but in other embodiments, the tapered shape of the magnetic structure 12 may be other tapered shapes. In the first embodiment, the magnetic structure 12 is composed of the second magnetic block 122 and the first magnetic block 121, but in other embodiments, the magnetic structure 12 may be manufactured by a single magnet (the magnet has a top and a bottom, the top of the magnet is narrower than the bottom of the magnet) or be composed of three or more magnets according to the manufacturing requirement or other requirements.

In the first embodiment, both the first magnetic block 121 and the second magnetic block 122 are right circular cylinders, but in other embodiments, the first magnetic block 121 and the second magnetic block 122 may be manufactured as other polygon cylinders or other shapes according to the manufacturing requirement or other requirements.

Accordingly, the above diameter and height of the second magnetic block 122 and the first magnetic block 121, a ratio between the diameter of the second magnetic block 122 and the diameter of the first magnetic block 121 is 1:2.5 (the diameter ratio may be in a range of 1:2 to 1:4, in other embodiments, the diameter ratio of the second magnetic block 122 and the first magnetic block 121 may be 1:1.3, 1:1.5, 1:2, 1:2.5, 1:3, 1:4, 1:5, 1:6, 1:7, 1:8, 1:9, 1:10, 1:11, 1:12, 1:13, 1:14, 1:15, 1:16, 1:17, 1:18, 1:19 or 1:20). A ratio between a height of the second magnetic block 122 and a height of the first magnetic block 121 is 5:1 (the height ratio may be in a range of 4:1 to 6:1, in other embodiments, the height ratio of the second magnetic block 122 and the first magnetic block 121 may be 20:1, 19:1, 18:1, 17:1, 16:1, 15:1, 14:1, 13:1, 12:1, 11:1, 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, 1:10, 1:11, 1:12, 1:13, 1:14, 1:15, 1:16, 1:17, 1:18, 1:19 or 1:20). Preferably, the aforementioned diameter and height of the second magnetic block 122 and the first magnetic block 121 may be magnified or minified according to the above diameter ratio and the above height ratio.

Alternatively, the aforementioned diameter and height of the second magnetic block 122 and the first magnetic block 121 may be magnified or minified in a diameter ratio and/or a height ratio different from the above diameter ratio and the above height ratio according to the manufacturing requirements or other requirements as long as the second magnetic block 122 and the first magnetic block 121 form a magnetic structure having a tapered shape.

In the first embodiment, the second magnetic block 122 is mounted inside the stand 11, the first magnetic block 121 contacts with the second magnetic block 122 and is mounted outside the stand 11 (on a bottom surface of the stand 11).

However, in other embodiments, the first magnetic block 121 may be mounted inside the stand 11 as long as the recesses 110 are located around the side 122A of the magnetic structure 12.

The above configuration of altitude difference between the recesses 110 and the magnetic structure 12 are merely for the purpose that an operator can readily take condensed magnetic beads in a tube by a pipette. In other embodiments, the altitude difference between the recesses 110 and the magnetic structure 12 can be designed as other altitude differences different from the altitude difference in the first embodiment according to the manufacturing requirements or other requirements.

Figure 6:
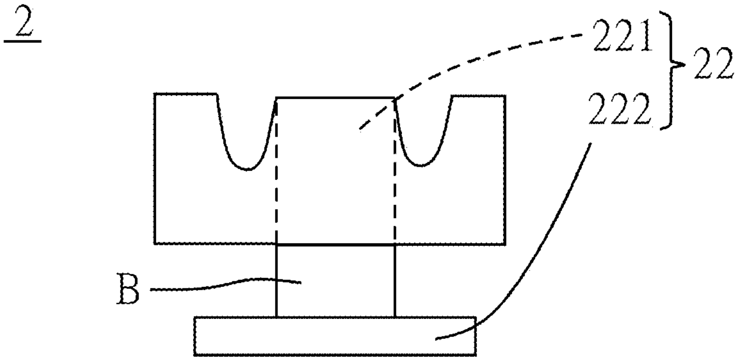
FIG. 6 is a side view of the magnetic stand according to a second embodiment of the present disclosure.

The second embodiment of the present disclosure provides a magnetic stand. Refer to FIG. 6, which shows a side view of the magnetic stand 2. The magnetic stand 2 is similar with the magnetic stand 1 of the first embodiment in structure, except that a wood block B (it can be other non-magnet block, e.g. a plastic block) is placed between a first magnetic block 221 and a second magnetic block 222.

Figure 7:
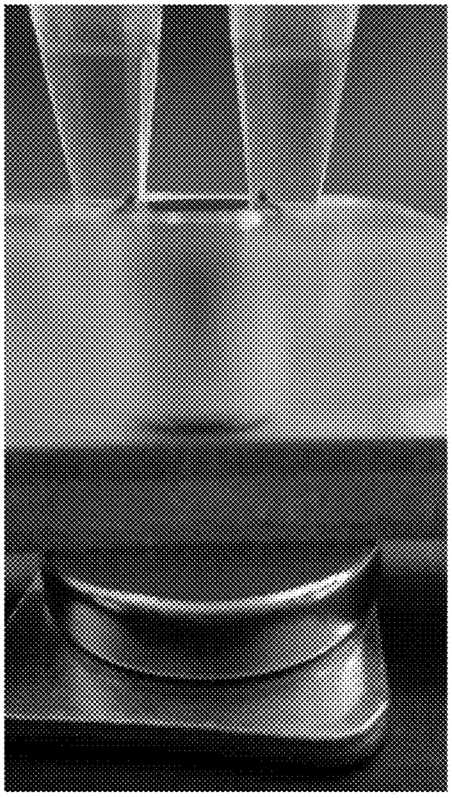
FIG. 7 is a picture showing magnetic beads condensed on an inner wall of a tube placed in the magnetic stand according to the second embodiment of the present disclosure.

Further referring to FIG. 7, even though the first magnetic block 221 and the second magnetic block 222 are separated by the wood block B, when two micro tubes containing magnetic beads are placed in recesses 210 of the magnetic stand 2, magnetic beads are still condensed on a spot of an inner wall of each micro tube. That is, the first magnetic block 221 is not necessarily in direct contact with the second magnetic block 222, as long as the first magnetic block 221 and the second magnetic block 222 can form a tapered shape, i.e. the second magnetic block 222 is above the first magnetic block 221. A magnetic structure 22 composed of the first magnetic block 221 and the second magnetic block 222 can make magnetic beads condense on a spot of an inner wall of a micro tube.

Figure 8:
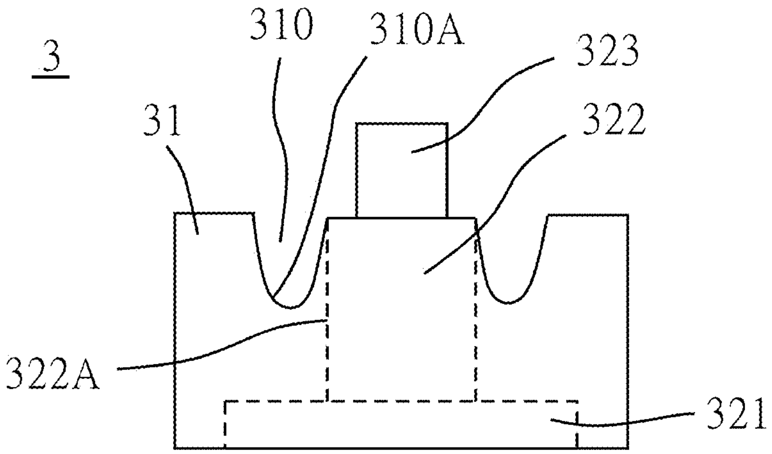
FIG. 8 is a side view of the magnetic stand according to a third embodiment of the present disclosure.

The third embodiment of the present disclosure provides a magnetic stand. Refer to FIG. 8, which shows a perspective view of the magnetic stand 3. The magnetic stand 3 comprises a stand 31, a first magnetic block 321, a second magnetic block 322 and a third magnetic block 323.

The second magnetic block 322 is disposed on the first magnetic block 321, and a diameter of the second magnetic block 322 is smaller than a diameter of the first magnetic block 321. The third magnetic block 323 is disposed on the second magnetic block 322, and a diameter of the third magnetic block 323 is smaller than a diameter of the second magnetic block 322. Thereby a magnetic structure 32 having a tapered shape is composed of the third magnetic block 323, the second magnetic block 322 and the first magnetic block 321. For example, the diameter of the third magnetic block 323 is 5 mm, the diameter of the second magnetic block 322 is 8 mm, the diameter of the first magnetic block 321 is 18 mm, and the height of the third magnetic block 323 is 5 mm, the height of the second magnetic block 322 is 10 mm, the height of the first magnetic block 321 is 2 mm.

The stand 31 has four recesses 310, and the recesses 310 are located around a side 322A of the magnetic structure 32 equidistantly spaced apart and surround the side 322A of the magnetic structure 32. A bottom 310A of each recess 310 of the stand 31 is at about a two thirds (⅔) height of the second magnetic block 322. In other embodiments, the bottom 310A of each recess 310 may be placed between a one third (⅓) height of the magnetic structure 32 and a 1.5-fold height of the magnetic structure 32, or the bottom 310A of each recess 310 may be placed between a top 321A of the first magnetic block 321 and a position where a 2-fold height of the second magnetic block 322 is.

Figure 9:
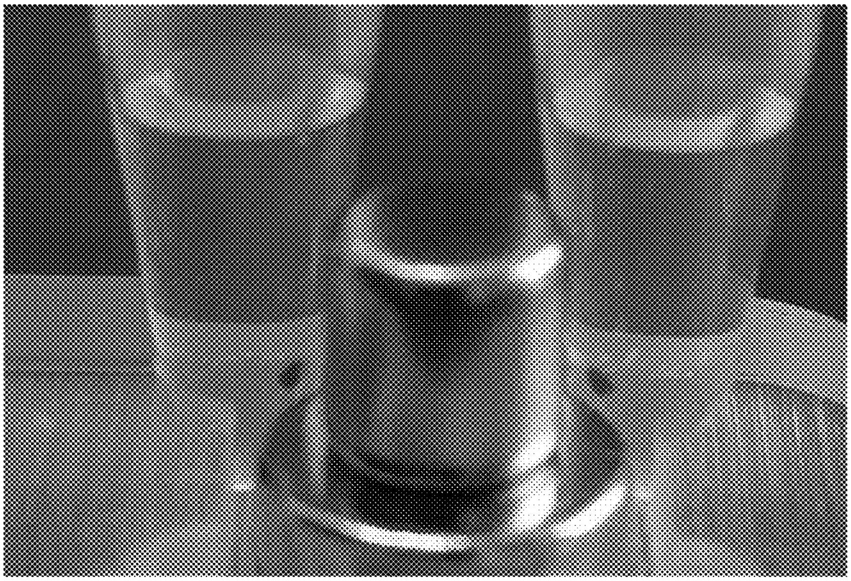
FIG. 9 is a picture showing magnetic beads condensed on an inner wall of a tube placed in the magnetic stand according to the third embodiment of the present disclosure.

Referring to FIG. 9, when two micro tubes containing solution and magnetic beads suspended in the solution are placed in the recesses 310 of the magnetic stand 3, magnetic beads are also condensed on a spot of an inner wall of each micro tube. The spot condensed magnetic beads resulting from enhanced magnetic field provides an improved liquid handling results, including a clear target for ease of removing of supernatant after beads separation, reduced agitation effect during pipetting, and enabling to retrieve the maximum amount of magnetic beads.

According to the above diameter and height of the third magnetic block 323 and the second magnetic block 322, a ratio between the diameter of the third magnetic block 323 and the diameter of the second magnetic block 322 is 1:1.6 (the diameter ratio may be in a range of 1:1.3 to 1:3, in other embodiments, the diameter ratio of the third magnetic block 323 and the diameter of the second magnetic block 322 may be 1:1.3, 1:1.6, 1:2, 1:3, 1:4, 1:5, 1:6, 1:7, 1:8, 1:9, 1:10, 1:11, 1:12, 1:13, 1:14, 1:15, 1:16, 1:17, 1:18, 1:19 or 1:20). A ratio between a height of the third magnetic block 323 and a height of the second magnetic block 322 is 1:2 (the diameter ratio may be in a range of 1:1 to 1:3, in other embodiments, the height ratio of the third magnetic block 323 and the second magnetic block 322 may be 20:1, 19:1, 18:1, 17:1, 16:1, 15:1, 14:1, 13:1, 12:1, 11:1, 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, 1:10, 1:11, 1:12, 1:13, 1:14, 1:15, 1:16, 1:17, 1:18, 1:19 or 1:20). Preferably, the aforementioned diameter and height of the third magnetic block 323 and the second magnetic block 322 may be magnified or minified according to the above diameter ratio and the above height ratio. The aforementioned diameter and height of the second magnetic block 322 and the first magnetic block 321 may be magnified or minified similar to the second magnetic block 122 and the first magnetic block 121 in the first embodiment.

Alternatively, the aforementioned diameter and height of the third magnetic block 323 and the second magnetic block 322 may be magnified or minified in a diameter ratio and/or a height ratio different from the above diameter ratio and the above height ratio according to the manufacturing requirements or other requirements as long as the third magnetic block 323, the second magnetic block 322 and the first magnetic block 321 form a magnetic structure having a tapered shape.

Figure 10:
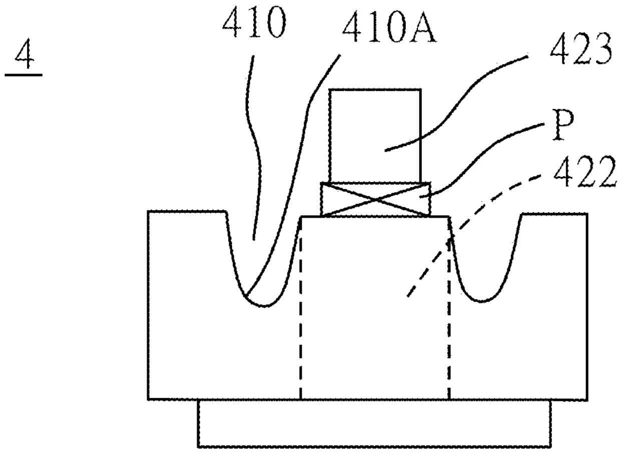
FIG. 10 is a side view of the magnetic stand according to a fourth embodiment of the present disclosure.

The fourth embodiment of the present disclosure provides a magnetic stand 4. Refer to FIG. 10, which shows a side view of the magnetic stand 4. The magnetic stand 4 is similar with the magnetic stand 3 of the third embodiment in structure, except that a plastic pad P is placed between a second magnetic block 422 and a third magnetic block 423.

Figure 11:
FIG. 11 is a picture showing magnetic beads condensed on an inner wall of a tube placed in the magnetic stand according to the fourth embodiment of the present disclosure.

Further referring to FIG. 11, even though the second magnetic block 422 and the third magnetic block 423 are separated by the plastic pad P. When two micro tubes containing solution and magnetic beads suspended in the solution are placed in recesses 410 of the magnetic stand 4, magnetic beads are still condensed on a spot of an inner wall of each micro tube. That is, the second magnetic block 422 are not necessarily in direct contact with the third magnetic block 423, as long as the combination of the second magnetic block 422 and the third magnetic block 423 can form a tapered shape, i.e. the third magnetic block 423 is above the second magnetic block 422.

For investigating a magnetic flux density of a magnetic structure having a tapered shape which produces magnetic attraction to make magnetic beads suspended in solution in a tube condense on a spot of an inner wall of the tube, a simulated magnetic flux density test is performed as the following procedure.

First, experimental examples 1-2 and comparative examples 1-8 are prepared.

Figure 12:
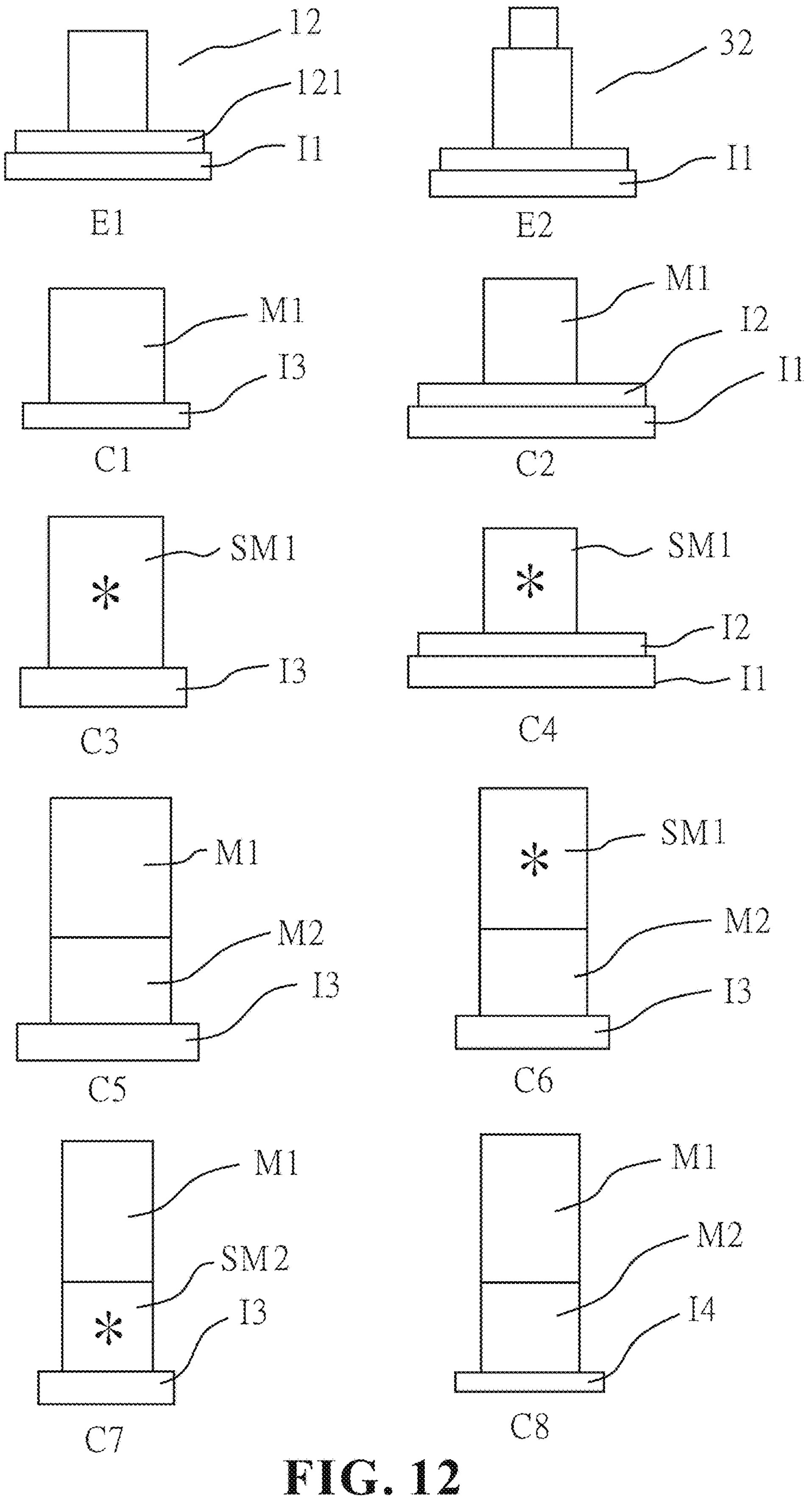
FIG. 12 shows the configurations of the experimental examples 1-2 and the comparative examples 1-8 in a magnetic flux density simulation test.
Figure 13A:
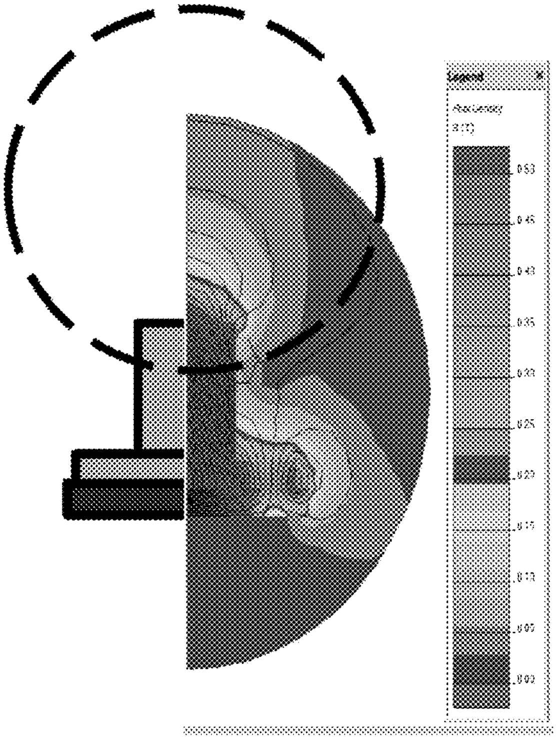
FIG. 13A is a diagram of the magnetic flux density result of the experimental example 1.
Figure 13B:
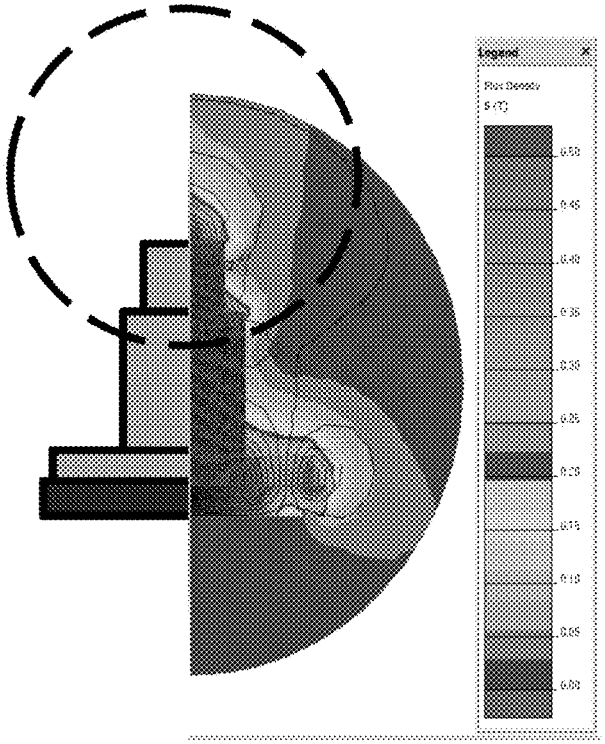
FIG. 13B is a diagram of the magnetic flux density result of the experimental example 2.
Figure 13C:
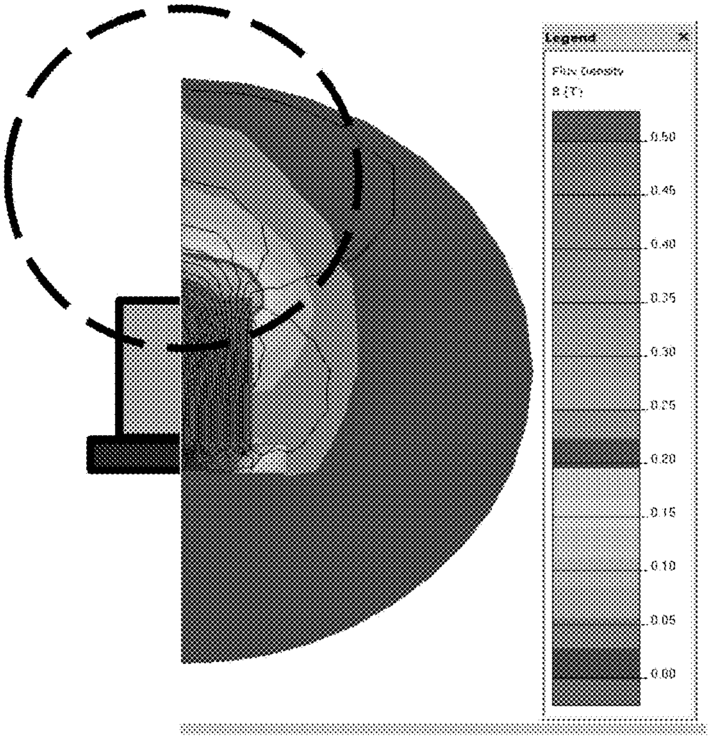
FIG. 13C is a diagram of the magnetic flux density result of the comparative example 1.
Figure 13D:
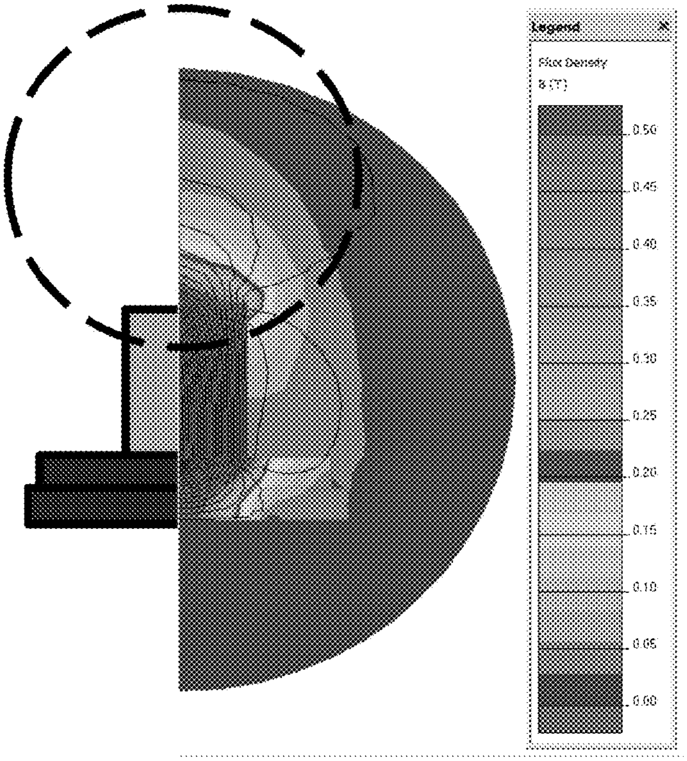
FIG. 13D is a diagram of the magnetic flux density result of the comparative example 2.
Figure 13E:
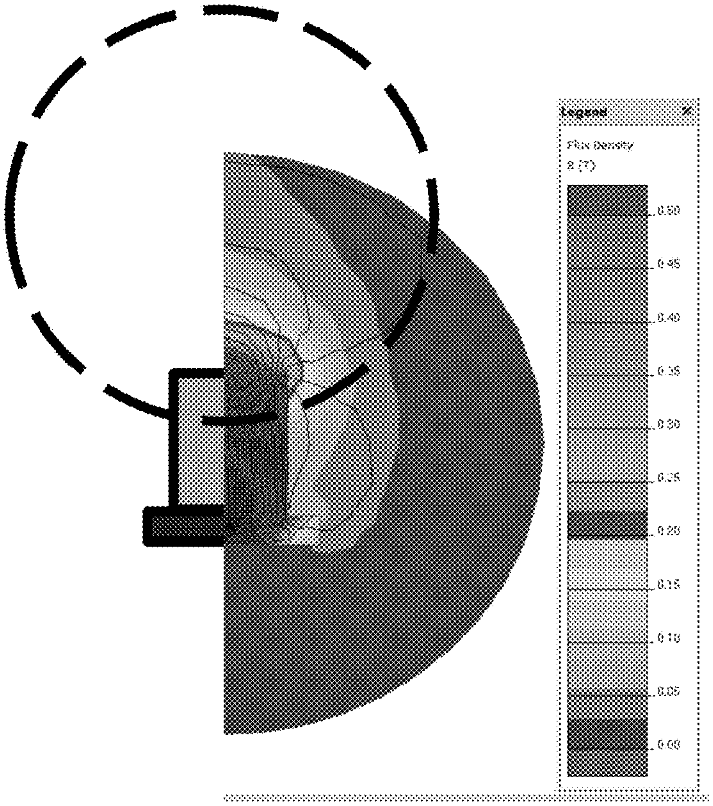
FIG. 13E is a diagram of the magnetic flux density result of the comparative example 3.
Figure 13F:
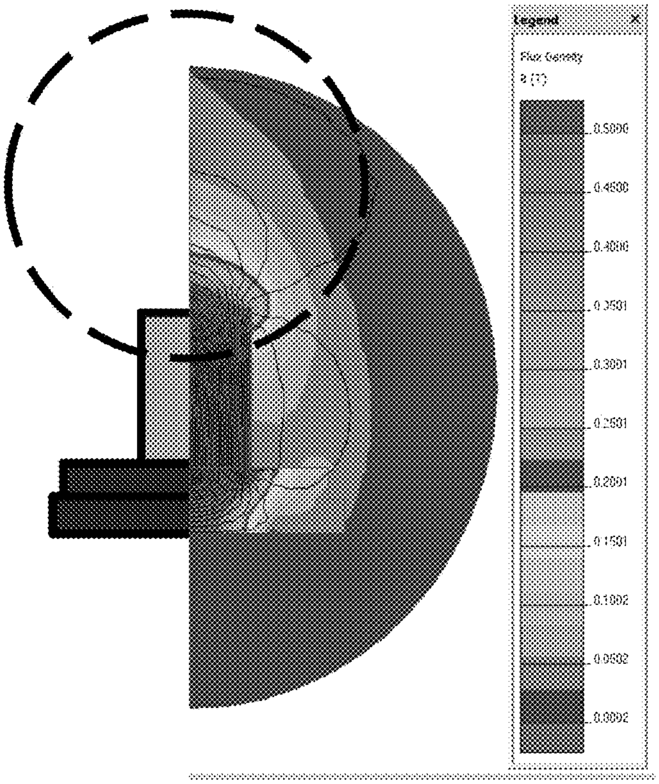
FIG. 13F is a diagram of the magnetic flux density result of the comparative example 4.
Figure 13G:
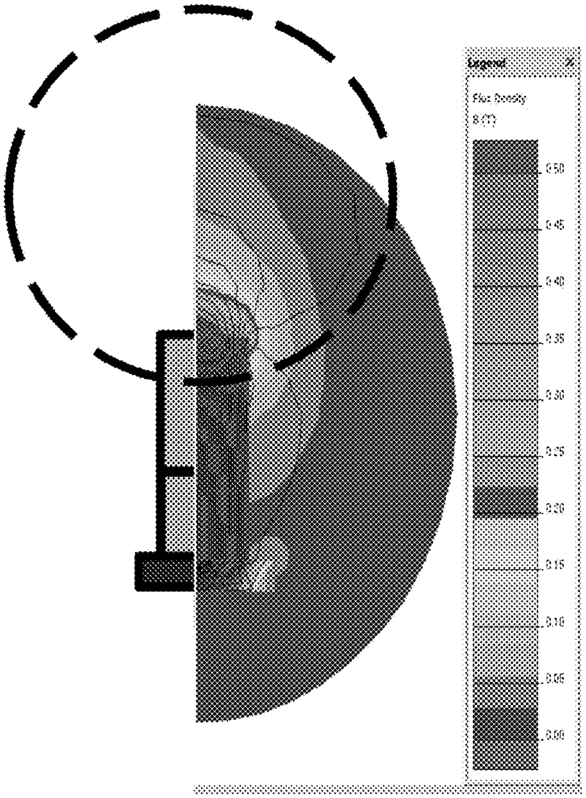
FIG. 13G is a diagram of the magnetic flux density result of the comparative example 5.
Figure 13H:
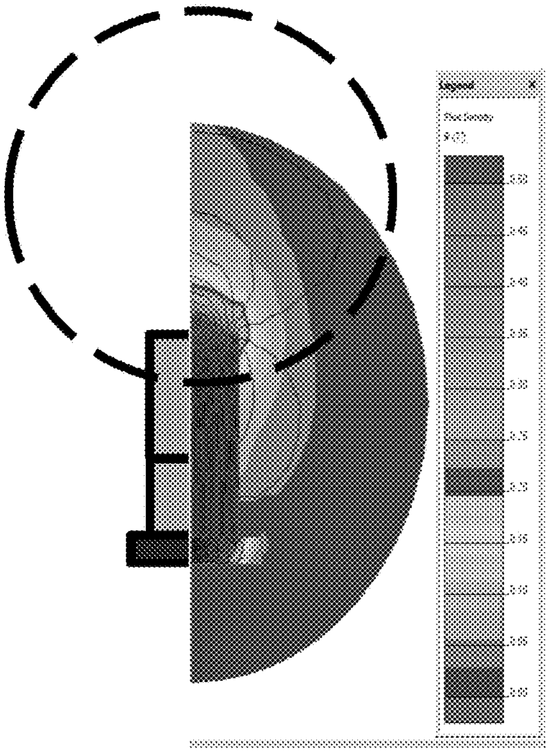
FIG. 13H is a diagram of the magnetic flux density result of the comparative example 6.
Figure 13I:
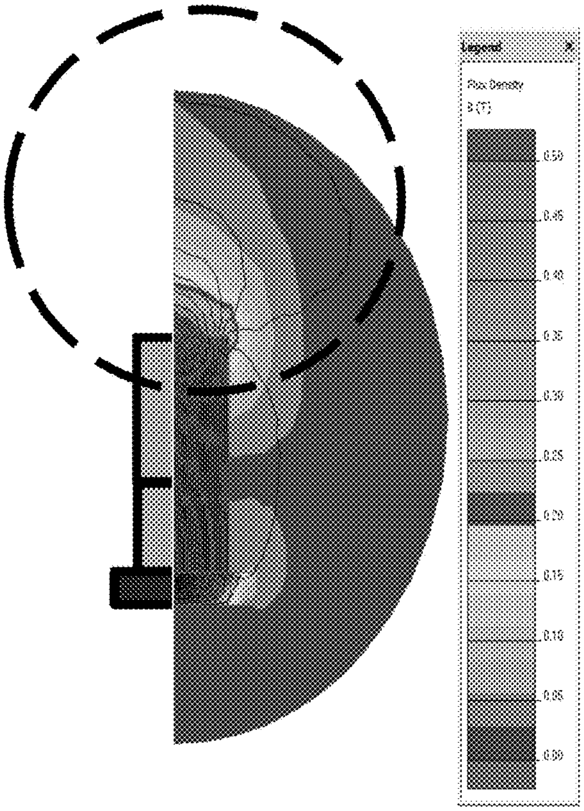
FIG. 13I is a diagram of the magnetic flux density result of the comparative example 7.
Figure 13J:
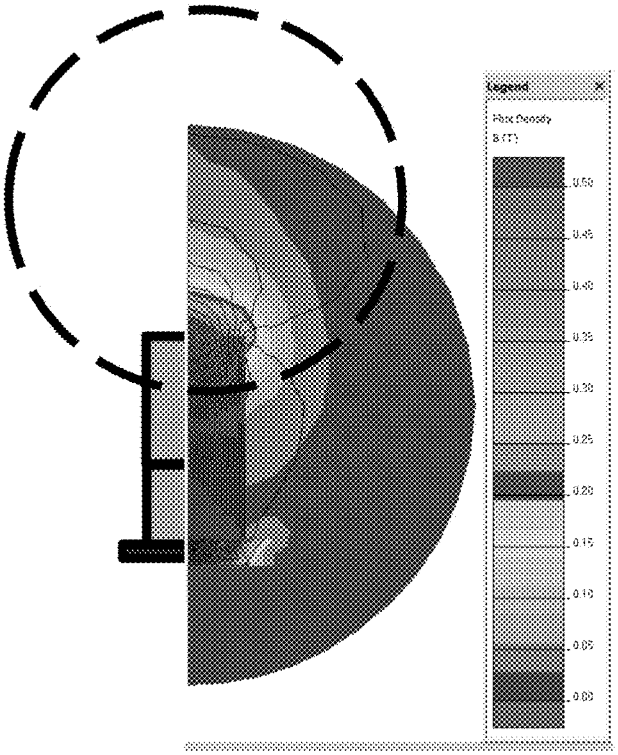
FIG. 13J is a diagram of the magnetic flux density result of the comparative example 8.

The configurations of experimental examples 1-2 and comparative examples 1-8 are shown in FIG. 12. The experimental examples 1-2 are referred to as E1 and E2 in FIG. 12 separately. The comparative examples 1-8 are referred to as C1-C8 in FIG. 12 separately.

The experimental example 1 comprises the magnetic structure 12 of the first embodiment and a ferrous metal plate I1 (the ferrous metal plate may be replaced by other metal plates that are able to be magnetically attracted). The ferrous metal plate I1 is disposed on a bottom of the magnetic structure 12, and the ferrous metal plate I1 has a width of 19 mm and a height of 2 mm. In other embodiments, a ratio between a horizontal cross-sectional area of the metal plate I1 is larger than 70% of a horizontal cross-sectional area of the first magnetic block 121, that is, the size of the ferrous metal plate I1 can be 30% smaller, equal to, or larger than the first magnetic block 121. The ferrous metal plate I1 further provides an advantage. Specifically, it is known that magnetic fields would seek the shortest path from the North Pole to the South Pole, the ferrous metal plate I1 attached to the magnetic structure 12 can provide the magnetism flow with an alternative shortcut through the ferrous metal plate I1 instead of the air. As a result, when the ferrous metal plate I1 is attached to one pole of the magnetic structure 12, it redistributes and increases the magnetic flux density at its opposite pole. When most of the magnetism flow from one pole is directed to the ferrous metal plate I1, the change of magnetic flux density will plateau on the opposite pole.

The experimental example 2 comprises the magnetic structure 32 of the third embodiment and a ferrous metal plate I1, the ferrous metal plate I1 is disposed on a bottom of the magnetic structure 32, and the ferrous metal plate I1 has a diameter of 19 mm and a height of 2 mm.

The comparative example 1 comprises a magnetic structure and a ferrous metal plate I3, the ferrous metal plate I3 is disposed on a bottom of the magnetic structure. The magnetic structure is composed of a single magnet M1 (N35 neodymium magnet) having a diameter of 8 mm and a height of 10 mm. The ferrous metal plate I3 has a diameter of 9 mm and a height of 2 mm.

The comparative example 2 comprises a magnetic structure, a ferrous metal plate I1 and a ferrous metal plate I2, the ferrous metal plate I2 is disposed on a bottom of the magnetic structure, the ferrous metal plate I1 is disposed on a bottom of the ferrous metal plate I2. The magnetic structure is composed of a single magnet M1 (N35 neodymium magnet) having a diameter of 8 mm and a height of 10 mm. The ferrous metal plate I1 has a diameter of 19 mm and a height of 2 mm. The ferrous metal plate I2 has a diameter of 18 mm and a height of 2 mm.

The comparative example 3 comprises a magnetic structure and a ferrous metal plate I3, the ferrous metal plate I3 is disposed on a bottom of the magnetic structure. The magnetic structure is composed of a single strong magnet SM1 (N42 neodymium magnet) having a diameter of 8 mm and a height of 10 mm. The ferrous metal plate I3 has a diameter of 9 mm and a height of 2 mm.

The comparative example 4 comprises a magnetic structure, a ferrous metal plate I1 and a ferrous metal plate I2, the ferrous metal plate I2 is disposed on a bottom of the magnetic structure, and the ferrous metal plate I1 is disposed on a bottom of the ferrous metal plate I2. The magnetic structure is composed of a single strong magnet SM1 (N42 neodymium magnet) having a diameter of 8 mm and a height of 10 mm. The ferrous metal plate I1 has a diameter of 19 mm and a height of 2 mm. The ferrous metal plate I2 has a diameter of 18 mm and a height of 2 mm.

The comparative example 5 comprises a magnetic structure and a ferrous metal plate I3, the ferrous metal plate I3 is disposed on a bottom of the magnetic structure. The magnetic structure is composed of a magnet M1 (N35 neodymium magnet) having a diameter of 8 mm and a height of 10 mm and a magnet M2 (N35 neodymium magnet) having a diameter of 8 mm and a height of 5 mm, the magnet M2 is disposed under the magnet M1. The ferrous metal plate I3 has a diameter of 9 mm and a height of 2 mm.

The comparative example 6 comprises a magnetic structure and a ferrous metal plate I3, the ferrous metal plate I3 is disposed on a bottom of the magnetic structure. The magnetic structure is composed of a strong magnet SM1 (N42 neodymium magnet) having a diameter of 8 mm and a height of 10 mm and a magnet M2 (N35 neodymium magnet) having a diameter of 8 mm and a height of 5 mm, the magnet M2 is disposed under the strong magnet SM1. The ferrous metal plate I3 has a diameter of 9 mm and a height of 2 mm.

The comparative example 7 comprises a magnetic structure and a ferrous metal plate I3, and the ferrous metal plate I3 is disposed on a bottom of the magnetic structure. The magnetic structure is composed of a magnet M1 (N35 neodymium magnet) having a diameter of 8 mm and a height of 10 mm and a strong magnet SM2 (N42 neodymium magnet) having a diameter of 8 mm and a height of 5 mm, and the strong magnet SM2 is disposed under the magnet M1. The ferrous metal plate I3 has a diameter of 9 mm and a height of 2 mm.

The comparative example 8 comprises a magnetic structure and a ferrous metal plate I4, and the ferrous metal plate I4 is disposed on a bottom of the magnetic structure. The magnetic structure is composed of a magnet M1 (N35 neodymium magnet) having a diameter of 8 mm and a height of 10 mm and a magnet M2 (N35 neodymium magnet) having a diameter of 8 mm and a height of 5 mm, and the magnet M2 is disposed under the magnet M1. The ferrous metal plate I4 has a diameter of 9 mm and a height of 1 mm.

Further referring to FIG. 12, the shape of the magnetic structures of the above experimental examples is tapered and the shape of the magnetic structures of the above comparative examples is a right circular block.

After the experimental examples 1-2 and the comparative examples 1-8 are prepared, the simulated magnetic flux densities of the experimental examples 1-2 and the comparative examples 1-8 are then detected. The simulated magnetic flux densities of the experimental examples 1-2 and the comparative examples 1-8 are simulated by QuickField (software). First, the simulated magnet models set according to the experimental examples 1-2 and the comparative examples 1-8 are built into the QuickField. Images of the simulated magnetic flux densities of the experimental examples 1-2 and the comparative examples 1-8 are outputted by the software QuickField according the manual of QuickField. Then, the above images of the simulated magnetic flux densities in the target region indicated by dotted line circles shown in FIG. 13A-FIG. 13J of the experimental examples 1-2 and the comparative examples 1-8 are quantified by Photoshop according the manual of Photoshop.

FIG. 13A-FIG. 13J show diagrams of the magnetic flux density result of the experimental examples 1-2 and comparative examples 1-8. The result reveals that the experimental examples 1-2 have similar magnetic flux densities which are different from the magnetic flux densities of the comparative examples 1-8. According to the result of FIGS. 13A and 13B, the position of the recesses 110/the recesses 310 as mentioned above makes the recesses 110/the recesses 310 under the effect of magnetic flux densities of the magnetic structure 12/the magnetic structure 32. That is, the tapered shape of the magnetic structure can provided the advantage of condensing magnetic beads, but a conventional magnetic structure with a shape of a right circular block cannot provided the advantage of condensing magnetic beads, no matter what the size of magnet, the magnetic field strength, the number of magnets and the ferrous metal plate or the configuration of the strong magnet is.

Figure 14:
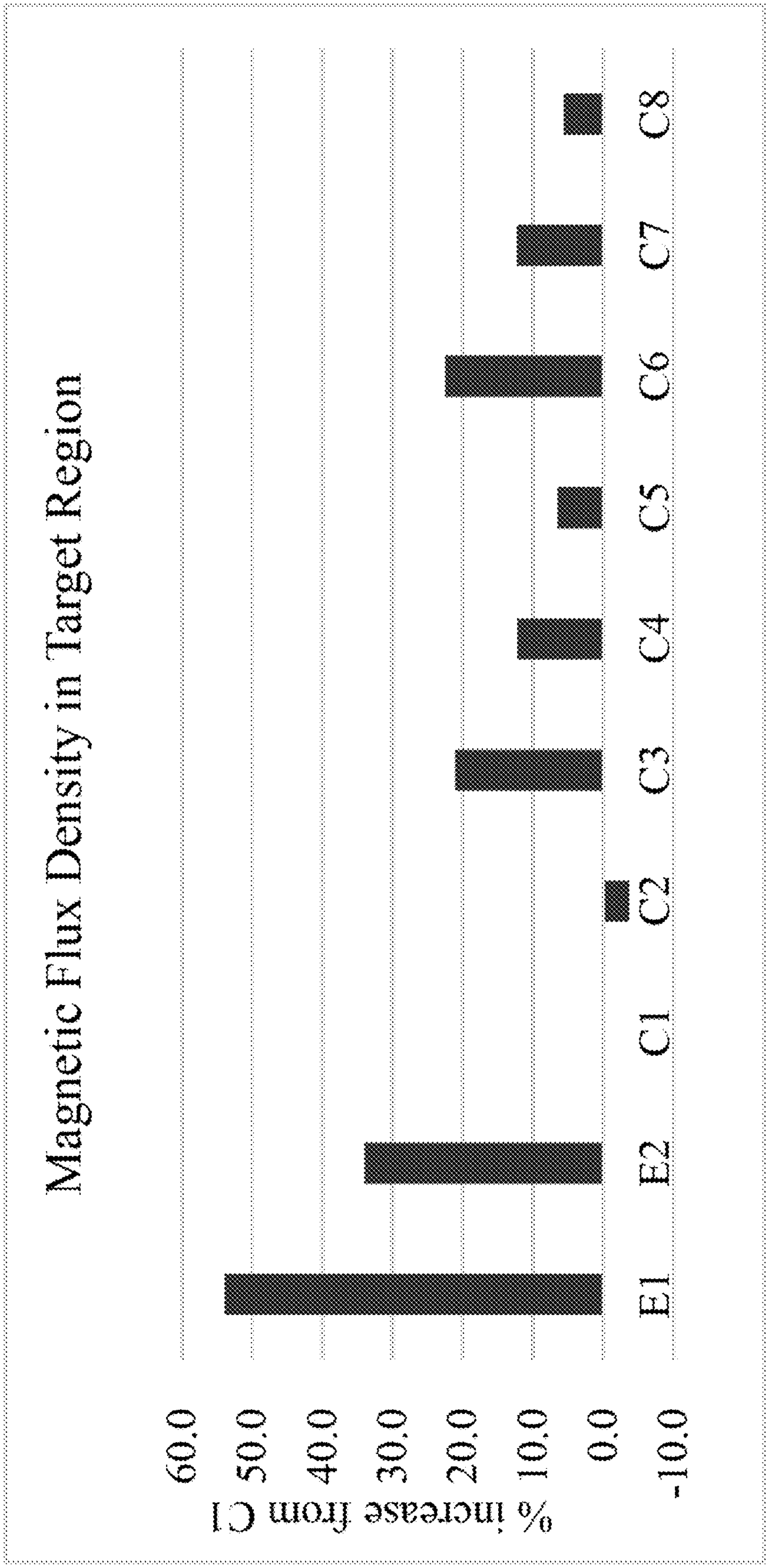
FIG. 14 is a diagram of the quantification result of the simulated magnetic flux densities of the experimental examples 1-2 and comparative examples 1-8.

FIG. 14 shows the diagram of the quantification result of the simulated magnetic flux densities of the experimental examples 1-2 and comparative examples 1-8. FIG. 14 shows relative magnetic flux densities of the experimental examples 1-2 and comparative examples 2-8 comparing with the magnetic flux density of comparative example 1. That is, the magnetic flux density of comparative example 1 is set as a datum value to calculate the increasing rate of the magnetic flux densities of the experimental examples 1-2 and comparative examples 2-8. As shown in FIG. 14, the experimental examples 1-2 have higher magnetic flux densities than the comparative examples 1-8.

For investigating a magnetic flux density of a magnetic structure having a tapered shape as aforementioned but without any ferrous metal plate, a simulated magnetic flux density test is performed as the following procedure.

First, experimental examples 3-4 and comparative examples 9-13 are prepared.

Figure 15:
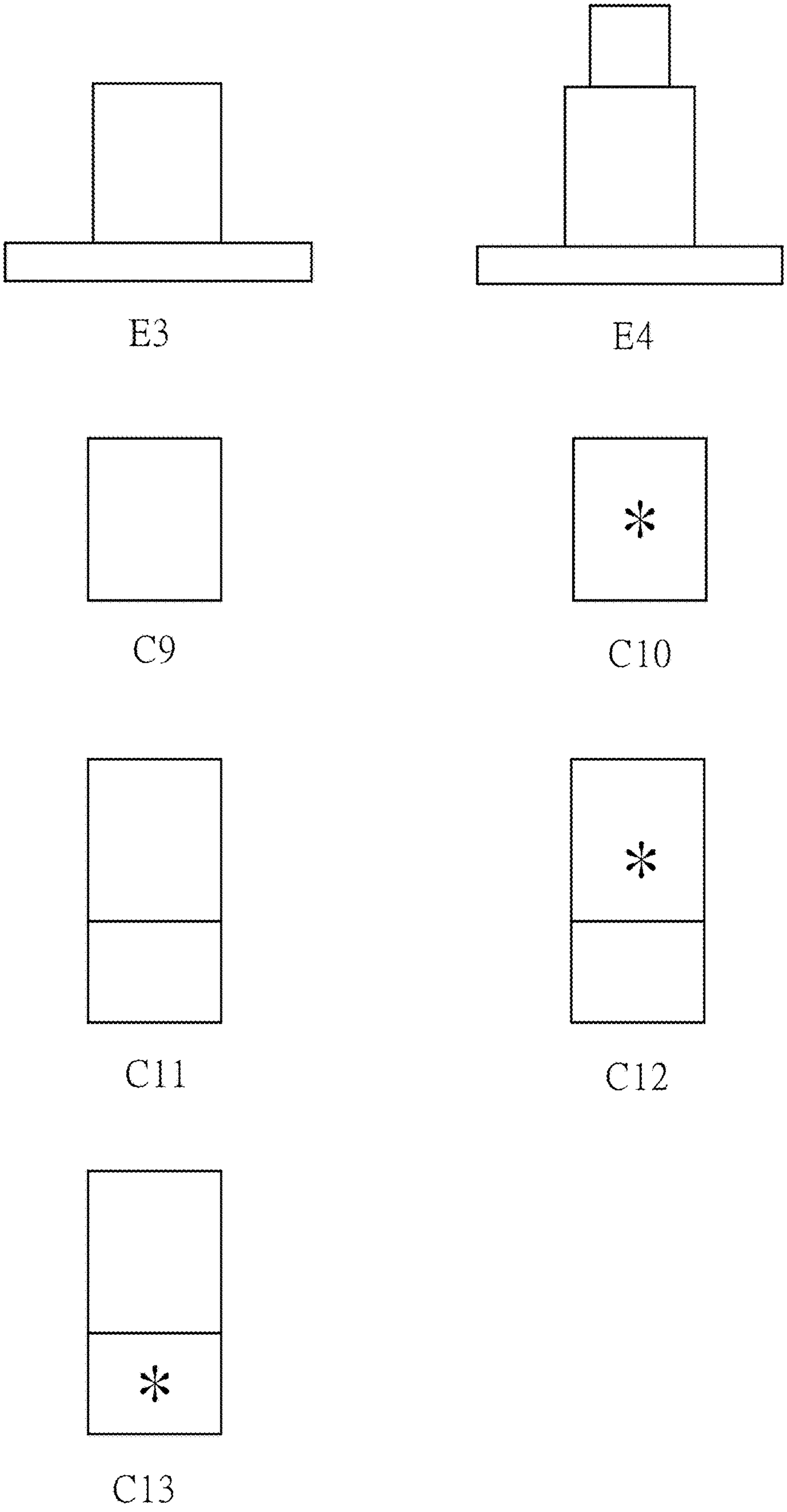
FIG. 15 shows the configurations of the experimental examples 3-4 and the comparative examples 9-13 in a magnetic flux density simulation test.

The configurations of experimental examples 3-4 and comparative examples 9-13 are shown in FIG. 15. The experimental examples 3-4 are referred to as E3 and E4 in FIG. 15, separately. The comparative examples 9-13 are referred to as C9-C13 in FIG. 15, separately.

The experimental example 3 is configured as the experimental example 1 but without any ferrous metal plate; the experimental example 4 is configured as the experimental example 2 but without any ferrous metal plate; the comparative example 9 is configured as the comparative example 1 but without any ferrous metal plate; the comparative example 10 is configured as the comparative example 3 but without any ferrous metal plate; the comparative example 11 is configured as the comparative example 5 but without any ferrous metal plate; the comparative example 12 is configured as the comparative example 6 but without any ferrous metal plate; the comparative example 13 is configured as the comparative example 7 but without any ferrous metal plate.

After the experimental examples 3-4 and the comparative examples 9-13 are prepared, the simulated magnetic flux densities of the experimental examples 3-4 and the comparative examples 9-13 are then detected and quantified as the procedure of the above simulated magnetic flux density test. Afterward, the experimental example 3/the experimental example 4 is combined with a stand to perform a test of magnetic attraction of the experimental examples 3-4 to magnetic beads according to the above test of first embodiment.

Figure 16:
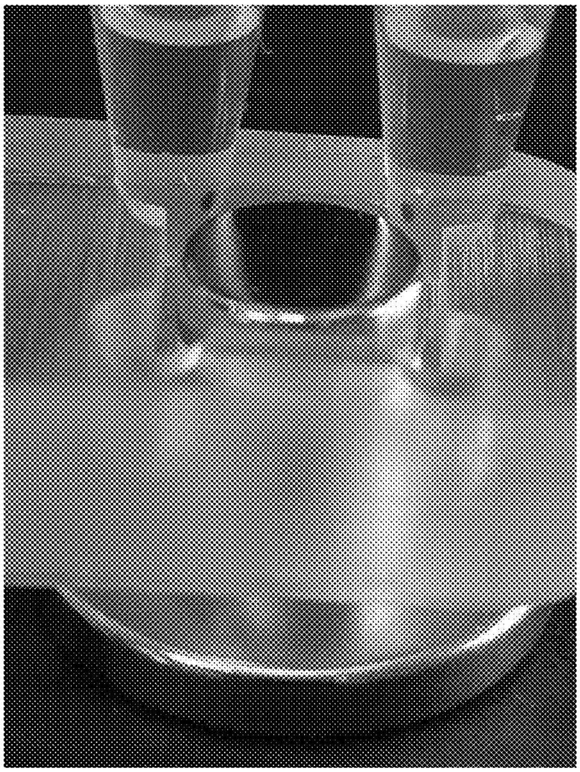
FIG. 16 is a picture showing magnetic beads condensed on an inner wall of a tube placed in the magnetic stand in the test of magnetic attraction of the experimental example 3 to magnetic beads.
Figure 17:
FIG. 17 is a picture showing magnetic beads condensed on an inner wall of a tube placed in the magnetic stand in the test of magnetic attraction of the experimental example 4 to magnetic beads.
Figure 18A:
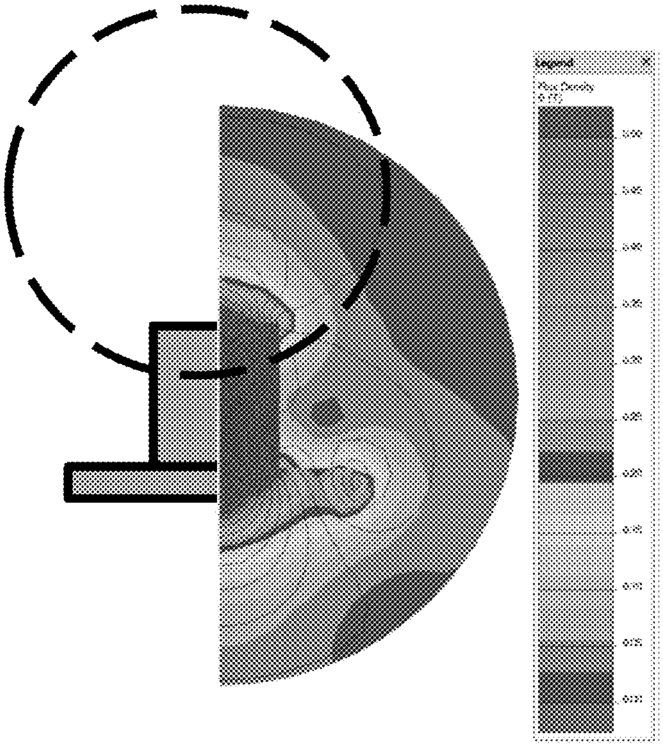
FIG. 18A is a diagram of the magnetic flux density result of the experimental example 3.
Figure 18B:
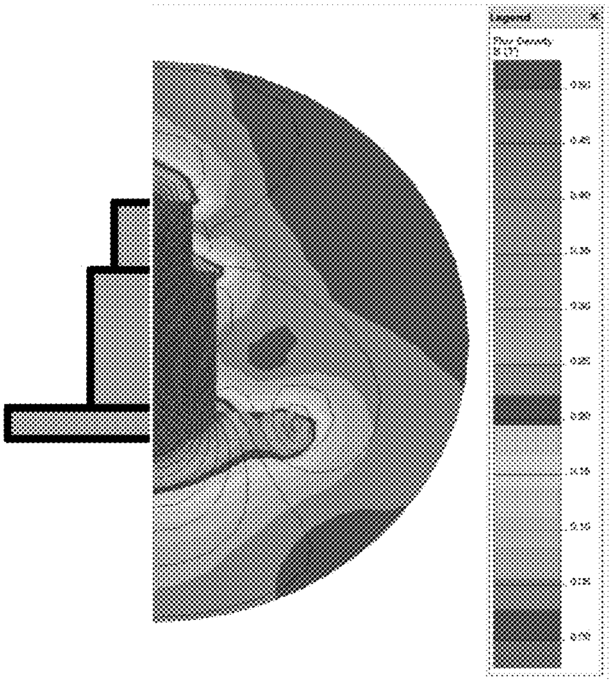
FIG. 18B is a diagram of the magnetic flux density result of the experimental example 4.
Figure 18C:
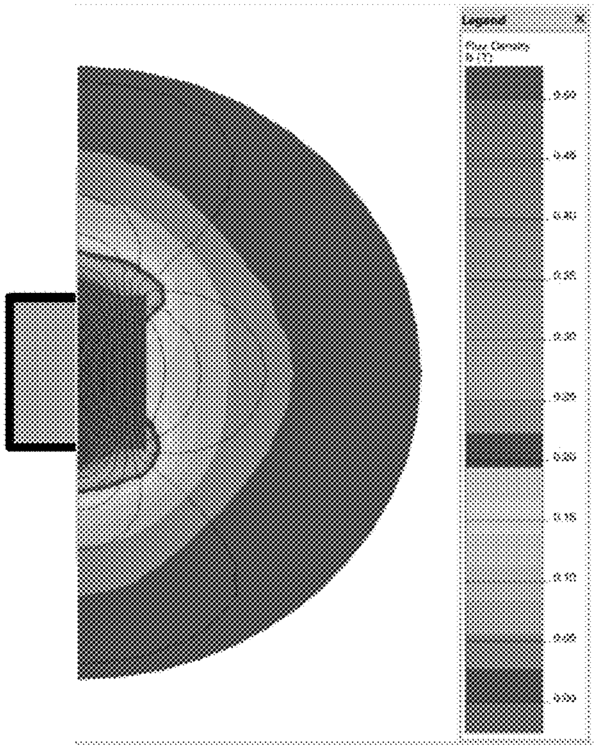
FIG. 18C is a diagram of the magnetic flux density result of the comparative example 9.
Figure 18D:
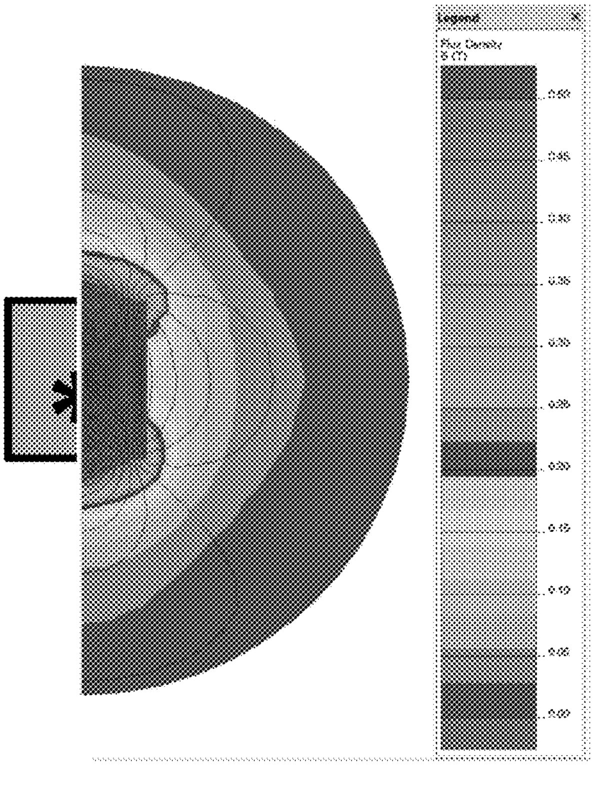
FIG. 18D is a diagram of the magnetic flux density result of the comparative example 10.
Figure 18E:
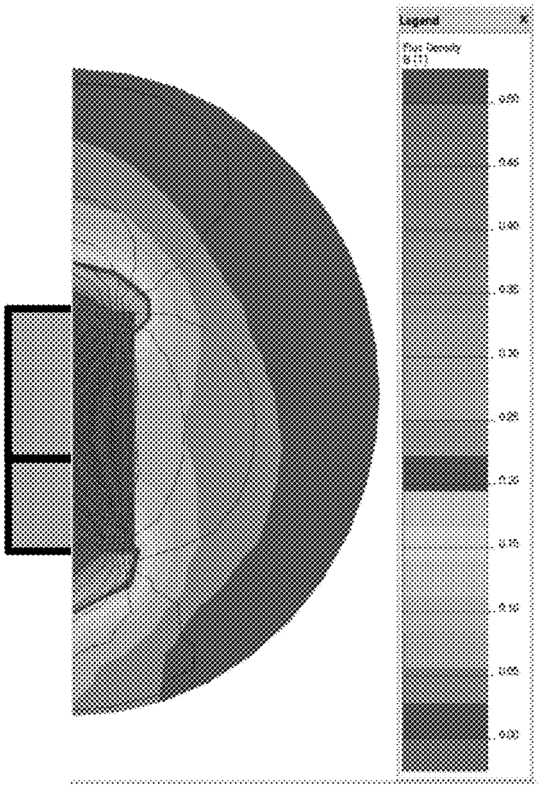
FIG. 18E is a diagram of the magnetic flux density result of the comparative example 11.
Figure 18F:
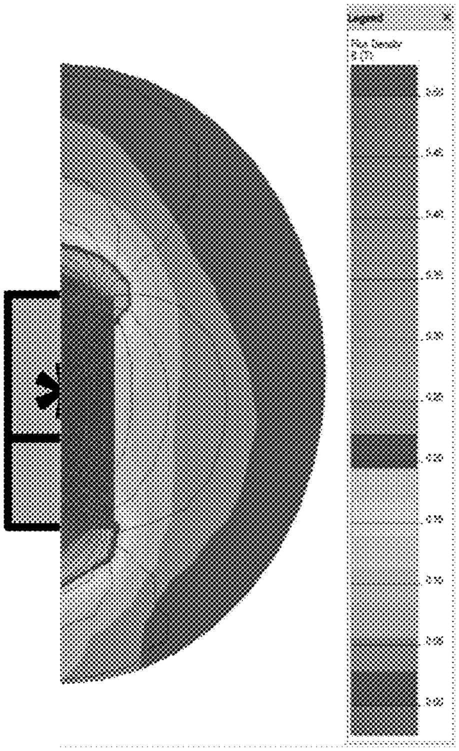
FIG. 18F is a diagram of the magnetic flux density result of the comparative example 12.
Figure 18G:
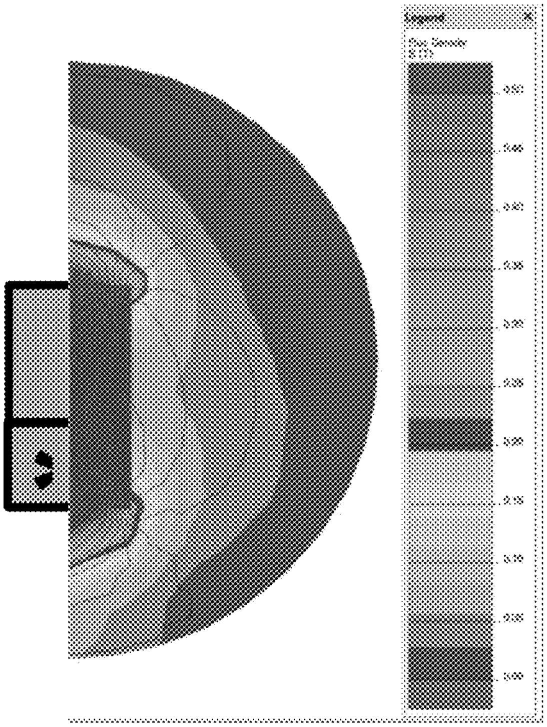
FIG. 18G is a diagram of the magnetic flux density result of the comparative example 13.

Refer to FIG. 16 and FIG. 17, which show the result of the test of magnetic attraction of the experimental examples 3-4 to magnetic beads. When the micro tubes containing magnetic beads suspended in the solution are placed in recesses of the above stand combined with the experimental example 3/the experimental example 4, magnetic beads are condensed on a spot or two spots of the inner wall of each micro tube.

FIG. 18A-FIG. 18G show diagrams of the magnetic flux density result of the experimental examples 3-4 and the comparative examples 9-13. The result reveals that the experimental examples 3-4 have similar magnetic flux densities which are different from the magnetic flux densities of the comparative examples 9-13. That is, the test results of the experimental examples 3-4 and the comparative examples 9-13 is similar with the test results of the experimental examples 1-2 and the comparative examples 1-8.

Figure 19:
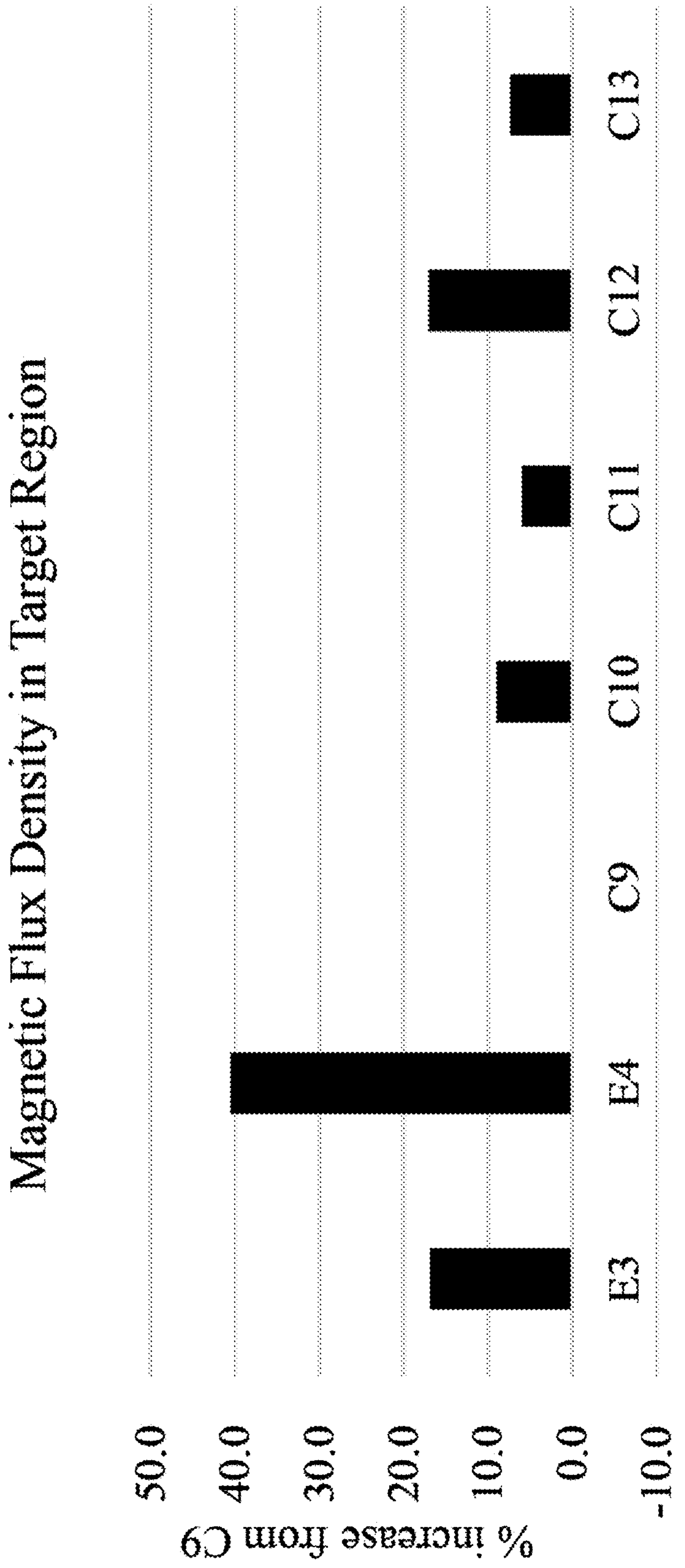
FIG. 19 is a diagram of the quantification result of the simulated magnetic flux densities of the experimental examples 3-4 and comparative examples 9-13.

FIG. 19 shows the diagram of the quantification result of the simulated magnetic flux densities of the experimental examples 3-4 and comparative examples 9-13. FIG. 19 shows relative magnetic flux densities of the experimental examples 3-4 and comparative examples 10-13 comparing with the magnetic flux density of comparative example 9. That is, the magnetic flux density of comparative example 9 is set as a datum value to calculate the increasing rate of the magnetic flux densities of the experimental examples 3-4 and comparative examples 10-13. As shown in FIG. 19, the experimental examples 3-4 have higher magnetic flux densities than the comparative examples 9-13.

Figure 20:
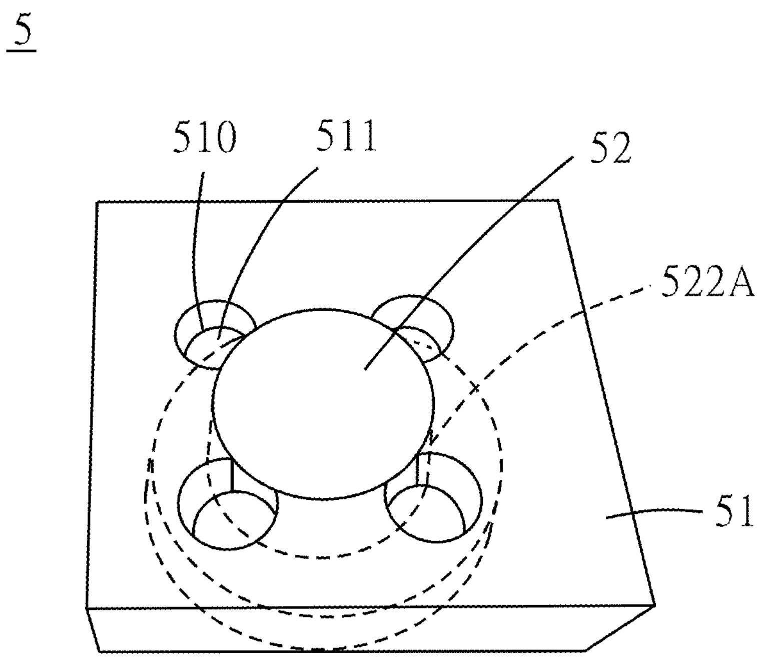
FIG. 20 is a perspective view of a part of the magnetic stand according to a fifth embodiment of the present disclosure.

The fifth embodiment of the present disclosure provides a magnetic stand. Refer to FIG. 20, which shows a perspective view of a part of the magnetic stand 5, FIG. 20 merely shows a stand 51 without a magnetic structure. The magnetic stand 5 is substantially identical to the magnetic stand 1 of the first embodiment in structure, except that the stand 51 has four openings 511 corresponding to the numbers of recesses 510. Each of the openings 511 is formed between the corresponding recess 510 and a side 522A of the magnetic structure 52 and links the corresponding recess 510 and the side 522A of the magnetic structure 52. The openings 511 can serve as windows for more clear observation of condensed magnetic beads in a micro tube. Also, the openings 511 enable a user to observe the lower part and the bottom of the micro tube for better liquid handling and, therefore, more accurate results.

In this embodiment, the stand 51 has four openings 511, but in other embodiments, the number of openings 511 may be correspondingly changed according to the number of recesses 510, that is, when the stand 51 merely has single recess 510, the stand 51 correspondingly has a single opening 511; when the stand 51 merely has six recesses 510, the stand 51 correspondingly has six openings 511.

Figure 21:
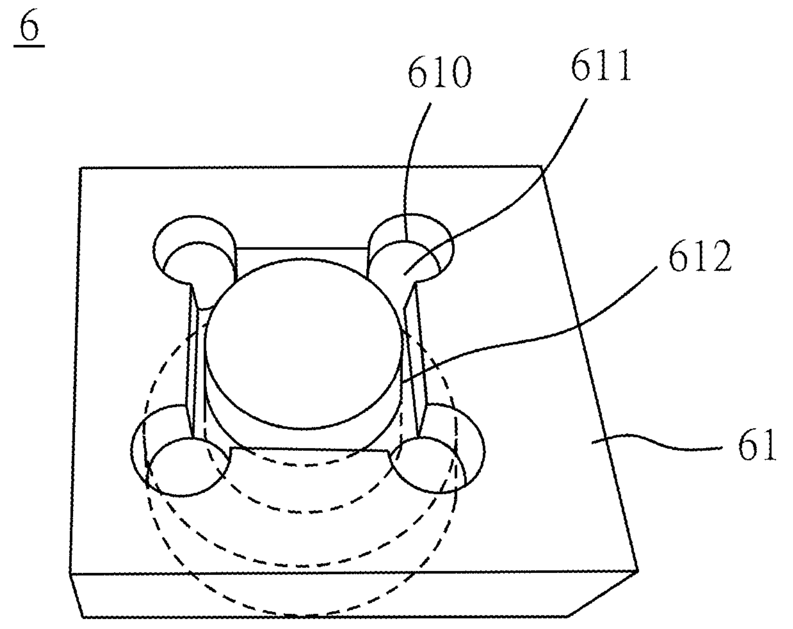
FIG. 21 is a perspective view of a part of the magnetic stand according to the sixth embodiment of the present disclosure.

The sixth embodiment of the present disclosure provides a magnetic stand. Refer to FIG. 21, which shows a perspective view of a part of the magnetic stand 6, FIG. 21 merely shows a stand 61 without a magnetic structure. The magnetic stand 6 is substantially identical to the magnetic stand 5 of the fifth embodiment in structure, except that the stand 61 has four slits 612 corresponding to the numbers of recesses 610. Each of the slits 612 is formed between two adjacent recesses 610 and links the adjacent recesses 610. The slits 612 can widen the visual field of observation of condensed magnetic beads in a micro tube from openings 611.

In this embodiment, the stand 61 has four slits 612, but in other embodiments, the number of slits 612 may be correspondingly changed according to the number of recesses 610.

Figure 22:
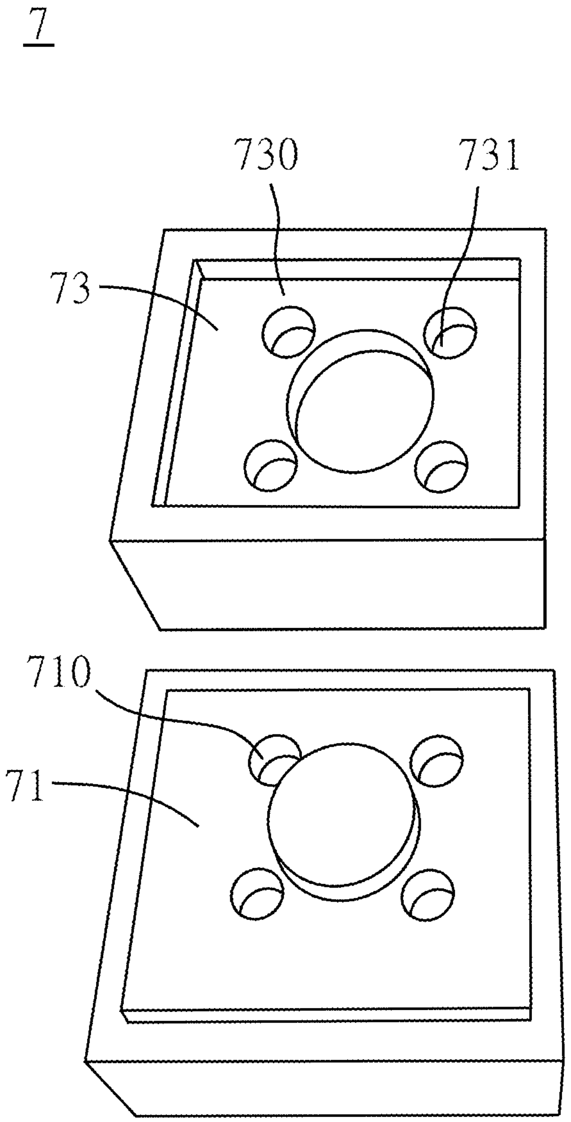
FIG. 22 is a perspective view of a lid of the magnetic stand according to the seventh embodiment of the present disclosure.

The seventh embodiment of the present disclosure provides a magnetic stand 7. Refer to FIG. 22, which shows a perspective view of a part of the magnetic stand 7. The magnetic stand 7 is substantially identical to the magnetic stand 1 of the first embodiment in structure, except that the magnetic stand 7 further comprises a lid 73, the lid 73 covers recesses 710 of a stand 71 to protect the recesses 710 from contaminations and the lid 73 has four grooves 731 formed on a surface 730 of the lid 73 facing toward the recesses 710 of the stand 71, the grooves 731 of the lid 73 make the lid 73 hold tubes as the function of the stand 71.

In this embodiment, the lid 73 has four grooves 731, but in other embodiments, the number of grooves 731 may be correspondingly changed according to the number of recesses 710, such as single groove 731, two or more grooves 731.

While the present disclosure has been described by means of specific embodiments, numerous modifications and variations could be made thereto by those skilled in the art without departing from the scope and spirit of the present disclosure set forth in the claims.

What is claimed is:

1. A magnetic stand, comprising:

a stand body having at least one recess cavity; and a magnetic structure having a tapered shape, wherein the magnetic structure has a top and a bottom, the top of the magnetic structure is narrower than the bottom of the magnetic structure, wherein the magnetic structure is located in/on the stand body, and the at least one recess cavity of the stand body is located around a side of the magnetic structure, and wherein the magnetic structure includes a first magnetic block and a second magnetic block, the second magnetic block is above the first magnetic block, and a diameter of the second magnetic block is smaller than a diameter of the first magnetic block.

2. The magnetic stand of claim 1, wherein a bottom of the at least one recess cavity of the stand body is placed between a top of the first magnet block and a position at twice the height of the second magnetic block from a bottom of the second magnetic block.

3. The magnetic stand of claim 1, wherein a ratio between the diameter of the second magnetic block and the diameter of the first magnetic block is 1:1.3 to 1:20.

4. The magnetic stand of claim 1, wherein a ratio between a height of the second magnetic block and a height of the first magnetic block is 20:1 to 1:20.

5. The magnetic stand of claim 1, wherein the magnetic structure includes a third magnetic block, the third magnetic block is above the second magnetic block, and a diameter of the third magnetic block is smaller than the diameter of the second magnetic block.

6. The magnetic stand of claim 5, wherein a bottom of the at least one recess cavity of the stand body is placed between a top of the first magnet block and a position at twice the height of the second magnetic block from a bottom of the second magnetic block.

7. The magnetic stand of claim 5, wherein a ratio between the diameter of the third magnetic block and the diameter of the second magnetic block is 1:1.3 to 1:20.

8. The magnetic stand of claim 5, wherein a ratio between a height of the third magnetic block and a height of the second magnetic block is 20:1 to 1:20.

9. The magnetic stand of claim 1, further comprising a metal plate, wherein the metal plate is able to be magnetically attracted and located in/on the stand body below the first magnetic block.

10. The magnetic stand of claim 9, wherein a horizontal cross-sectional area of the metal plate is larger than 70% of a horizontal cross-sectional area of the first magnetic block.

11. The magnetic stand of claim 1, wherein the stand body has an observation window opening formed to surround a side of the at least one recess cavity and communicate with the at least one recess cavity, and the observation window opening serves as an inlet that links the at least one recess cavity and the side of the magnetic structure.

12. The magnetic stand of claim 3, wherein the stand body has at least two recess cavities surrounding the side of the magnetic structure and a plurality of observation window openings corresponding to the numbers of the at least two recess cavities, each of the observation window openings is formed to surround a side of the corresponding recess cavity and communicate with the corresponding recess cavity, and each of the observation window openings serves as an inlet that links the corresponding recess cavity and the side of the magnetic structure.

13. The magnetic stand of claim 12, wherein the stand body has a plurality of observation window slits corresponding to the number of the at least two recess cavities, and each of the observation window slits is formed between two adjacent recess cavities and links the adjacent recess cavities.

14. The magnetic stand of claim 1, further comprising a lid covering the at least one recess cavity of the stand body to protect the at least one recess cavity from contamination and having a tube-holding groove formed on a surface of the lid facing toward the at least one recess cavity of the stand body.

15. A magnetic stand, comprising:

a stand body having at least two recess cavities;

a magnetic structure including a first magnetic block and a second magnetic block, wherein the first magnetic block and the second magnetic block are located in/on the stand body, the second magnetic block is above the first magnetic block, a diameter ratio between a diameter of the second magnetic block and a diameter of the first magnetic block is 1:1.3 to 1:20, and a height ratio between a height of the second magnetic block and a height of the first magnetic block is 20:1 to 1:20, and wherein the at least two recess cavities of the stand body surround a side of the second magnetic block, and a bottom of the at least two recess cavities of the stand body is placed between a top of the first magnet block and a position at twice the height of the second magnetic block from a bottom of the second magnetic block; and a plurality of observation window openings corresponding to the number of the at least two recess cavities, wherein each of the observation window openings is formed to surround a side of the corresponding recess cavity and communicate with the corresponding recess cavity, and each of the observation window openings serves as an inlet that links the corresponding recess cavity and the side of the magnetic structure.

16. The magnetic stand of claim 15, wherein the stand body has a plurality of observation window slits corresponding to the numbers of the at least two recess cavities, and each of the observation window slits is formed between two adjacent recess cavities and links the adjacent recess cavities.

17. A magnetic stand, comprising:

a stand body having at least two recess cavities;

a magnetic structure including a first magnetic block and a second magnetic block, wherein the first magnetic block and the second magnetic block are located in/on the stand body, the second magnetic block is above the first magnetic block, a diameter ratio between a diameter of the second magnetic block and a diameter of the first magnetic block is 1:2 to 1:4, and a height ratio between a height of the second magnetic block and a height of the first magnetic block is 4:1 to 6:1, and wherein the at least two recess cavities of the stand body surround a side of the second magnetic block, and a bottom of the at least two recess cavities of the stand body is placed between a top of the first magnet block and a position at twice the height of the second magnetic block from a bottom of the first magnetic block;

a plurality of observation window openings corresponding to the number of the at least two recess cavities, wherein each of the observation window openings is formed to surround a side of the corresponding recess cavity and communicate with the corresponding recess cavity, and each of the observation window openings serves as an inlet that links the corresponding recess cavity and the side of the magnetic structure; and a lid configured to cover the at least two recess cavities of the stand body to protect the at least two recess cavities from contamination and having a plurality of tube-holding grooves formed on a surface of the lid facing toward the at least two recess cavities of the stand body.

* * * * *